United States Patent [19]
Lawther et al.

[11] Patent Number: 5,893,655
[45] Date of Patent: Apr. 13, 1999

[54] MODE CHANGEOVER FOR FILM ADVANCE/FILM REWIND IN MOTORIZED CAMERA

[75] Inventors: Joel S. Lawther, East Rochester; Anthony DiRisio; Lee D. Oldfield, both of Rochester, all of N.Y.

[73] Assignee: Eastman Kodak Company, Rochester, N.Y.

[21] Appl. No.: 09/008,037

[22] Filed: Jan. 16, 1998

[51] Int. Cl.$^6$ .................................................. G03B 1/00
[52] U.S. Cl. .................................................. 396/403
[58] Field of Search .................................. 396/403, 404, 396/405, 411, 413, 418, 536

[56] References Cited

U.S. PATENT DOCUMENTS

| | | |
|---|---|---|
| Re. 32,850 | 1/1989 | Araki et al. . |
| Re. 33,436 | 11/1990 | Araki et al. . |
| 4,251,148 | 2/1981 | Stemme et al. . |
| 4,297,019 | 10/1981 | Yagi et al. . |
| 4,504,131 | 3/1985 | Kimura . |
| 4,568,164 | 2/1986 | Sahori . |
| 4,586,801 | 5/1986 | Nishizawa et al. . |
| 4,610,522 | 9/1986 | Tobioka . |
| 5,508,770 | 4/1996 | Lawther . |
| 5,552,848 | 9/1996 | Lawther . |

*Primary Examiner*—Howard B. Blankenship
*Attorney, Agent, or Firm*—Roger A. Fields

[57] ABSTRACT

A motorized camera comprising a bi-directional film drive motor having respective direction modes for film advance and for film rewind, and a movable door latch, is characterized in that the door latch is coupled with the motor to change the direction mode of the motor only when the door latch is moved.

7 Claims, 9 Drawing Sheets

MODE CHANGEOVER FOR FILM ADVANCE/FILM REWIND IN MOTORIZED CAMERA

FIELD OF THE INVENTION

The invention relates generally to the field of photography, and in particular to motorized cameras. More specifically, the invention relates to a mode changeover for film advance and film rewind in a motorized camera.

BACKGROUND OF THE INVENTION

Typically in some cameras the film transport apparatus is motorized. In operation, a leading end portion of a filmstrip originally protruding or advanced from a film cartridge loaded into the camera is attached to a film takeup spool. The take-up spool is rotated after each exposure to advance successive frames of the filmstrip from the cartridge, across the focal plane of a taking lens, and onto the take-up spool. Each time the take-up spool is rotated, an unexposed frame of the filmstrip is positioned in the focal plane of the taking lens and an exposed frame is wound onto the take-up spool. When every one of the available frames have been exposed, a trailing end portion of the filmstrip remains attached to a film supply spool inside the cartridge. This end-of-film condition produces a sudden increase in the film tension and in the motor current as the take-up spool attempts to withdraw the remainder of the filmstrip from the cartridge. A film tension sensor responds to the sudden increase in the film tension or a current detecting sensor responds to the sudden increase in the motor current, by reversing the motor drive to rotate the supply spool inside the cartridge in place of rotating the take-up spool. The supply spool then draws the exposed frames of the take-up spool and winds them into the cartridge.

Rather than a film tension sensor or a current detecting sensor, a film perforation sensor may be provided for detecting a turn-around perforation in a trailing end portion of the filmstrip to reverse the motor drive to initiate winding the exposed frames into the cartridge. See commonly assigned U.S. Pat. No. 5,552,848 issued Sep. 3, 1996 and U.S. Pat. No. 5,508,770 issued Apr. 16, 1996.

In each design, simplicity is a goal in order to keep the manufacturing cost of the motorized camera relatively low.

SUMMARY OF THE INVENTION

A motorized camera comprising a bi-directional film drive motor having respective direction modes for film advance and for film rewind, and a movable door latch, is characterized in that:

the door latch is coupled with the motor to change the direction mode of the motor only when the door latch is moved.

DETAILED DESCRIPTION OF THE INVENTION

The invention is disclosed as being embodied preferably in a motorized camera. Because the features of a motorized

2 camera are generally known, the description which follows is directed in particular only to those elements forming part of or cooperating directly with the disclosed embodiment. It is to be understood, however, that other elements may take various forms known to a person of ordinary skill in the art.

Figure 1:
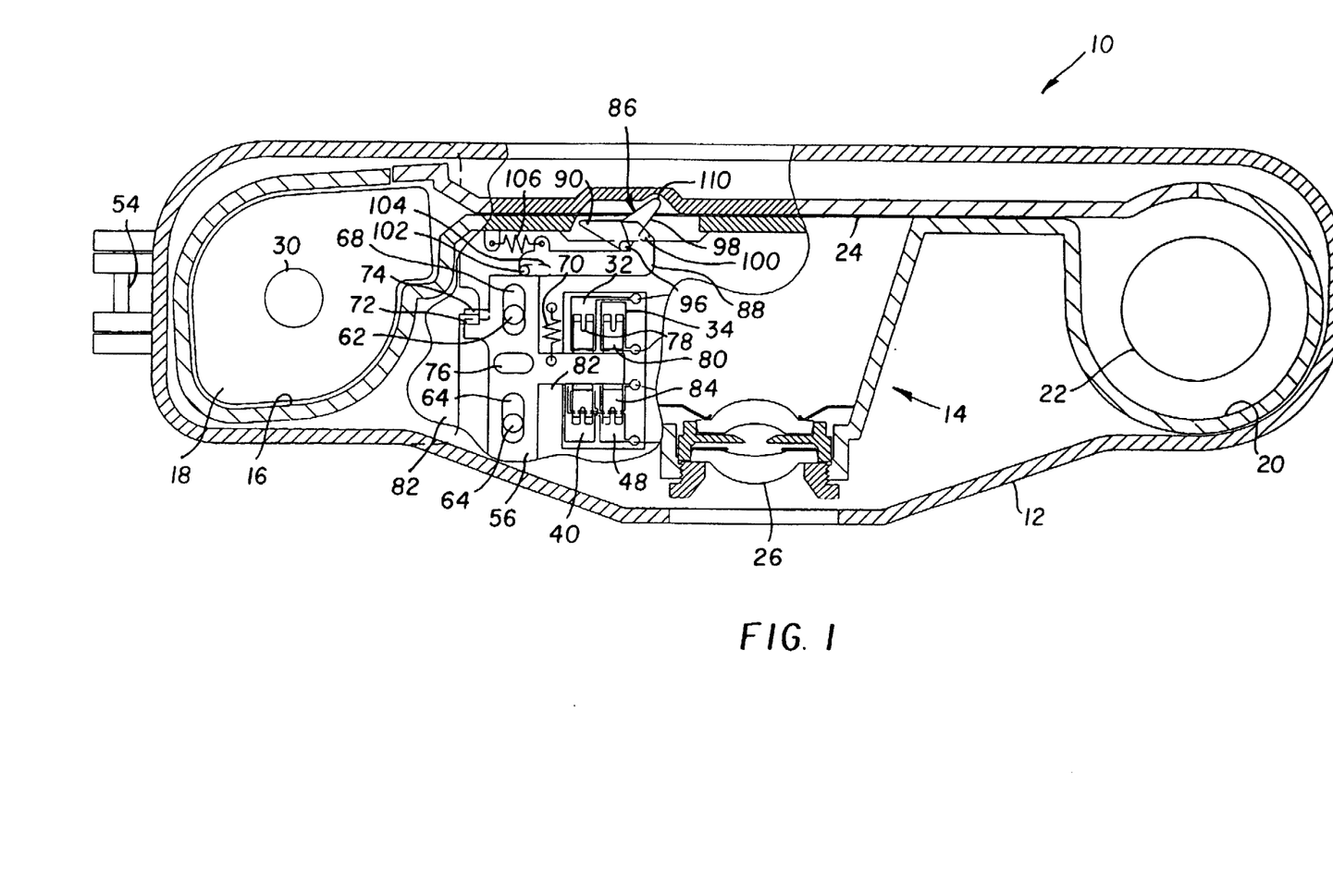
FIG. 1 is a plan bottom view of a motorized camera according to a preferred embodiment of the invention.

Referring now to the drawings, FIG. 1 shows a motorized camera 10 with a housing 12 that houses a main body part 14. The main body part 14 comprises a cartridge receiving chamber 16 for a known film cartridge 18, an exposed film roll chamber 20 which contains a film take-up spool 22 and a backframe opening 24 positioned behind a front taking lens 26.

Figure 2:
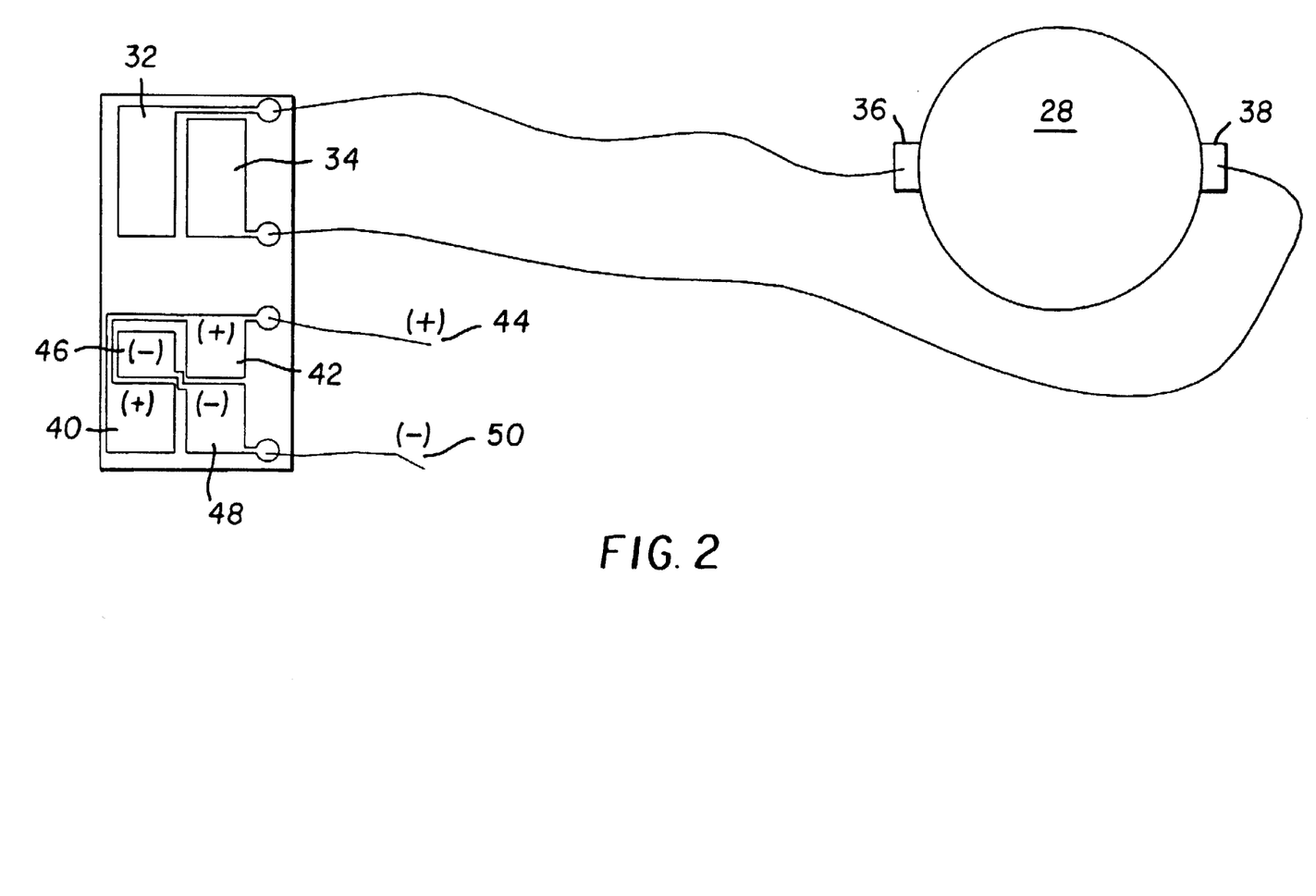
FIG. 2 is a plan bottom view of bidirectional film drive motor and pairs of motor contacts and battery contacts in the camera.

A bi-directional film drive motor 28, shown in FIGS. 2-9, has a forward direction mode for intermittent advance of a filmstrip 29 from a film supply spool 30 inside the film cartridge 18 to the take-up spool 22 and a reverse direction mode for continuous rewind of the filmstrip from the take-up spool back to the supply spool. As shown in FIG. 2, a pair of separate motor contacts 32 and 34 are connected to respective opposite poles 36 and 38 of the motor 28. A pair of positive (+) integral contacts 40 and 42 are connected to a positive terminal (+) 44 of a battery, not shown. A pair of negative (−) integral contacts 46 and 48 are connected to a negative terminal (−) 50 of the battery.

Figure 3:
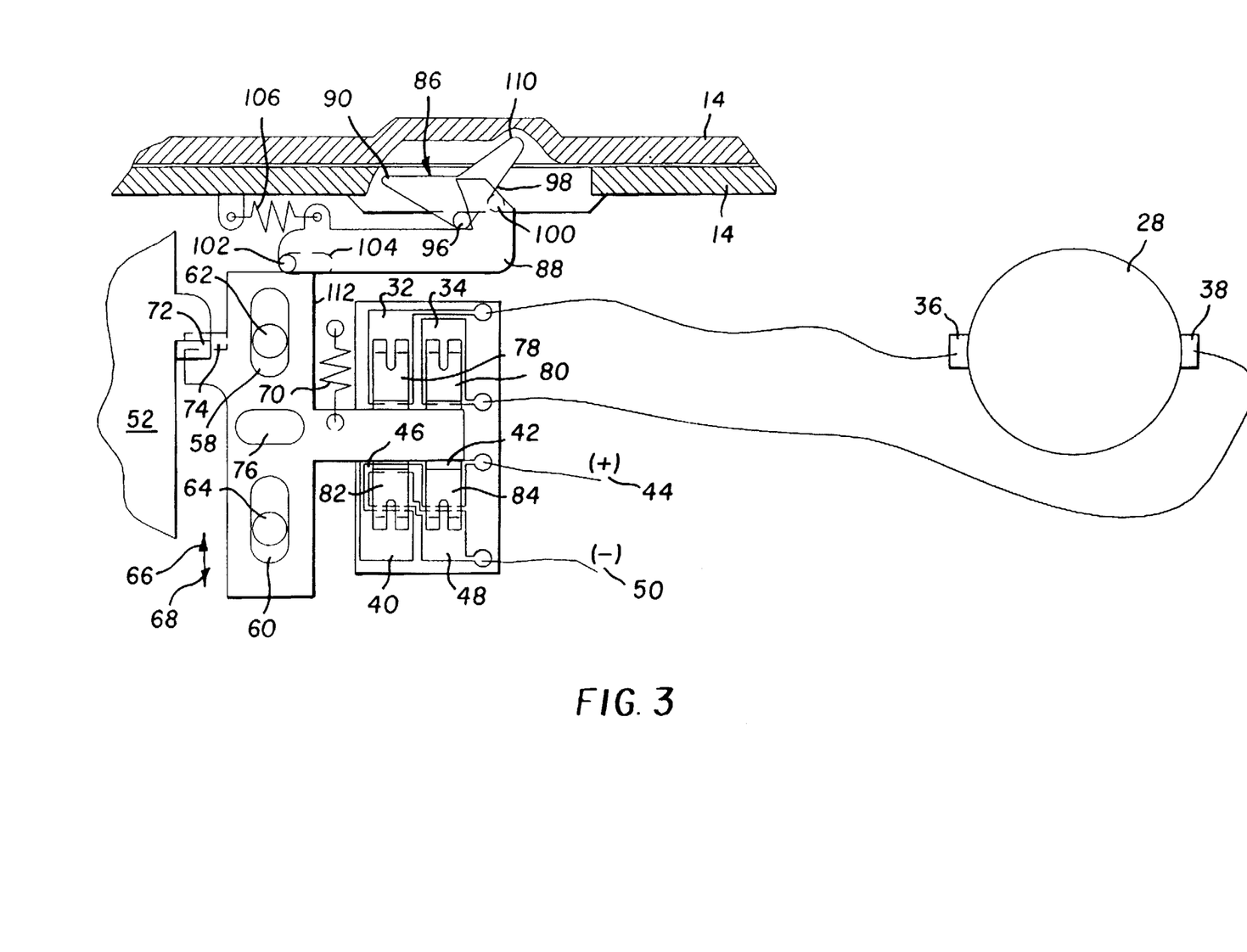
FIGS. 3-9 are plan bottom views similar to FIG. 1 depicting successive operation steps in the camera.
Figure 7:
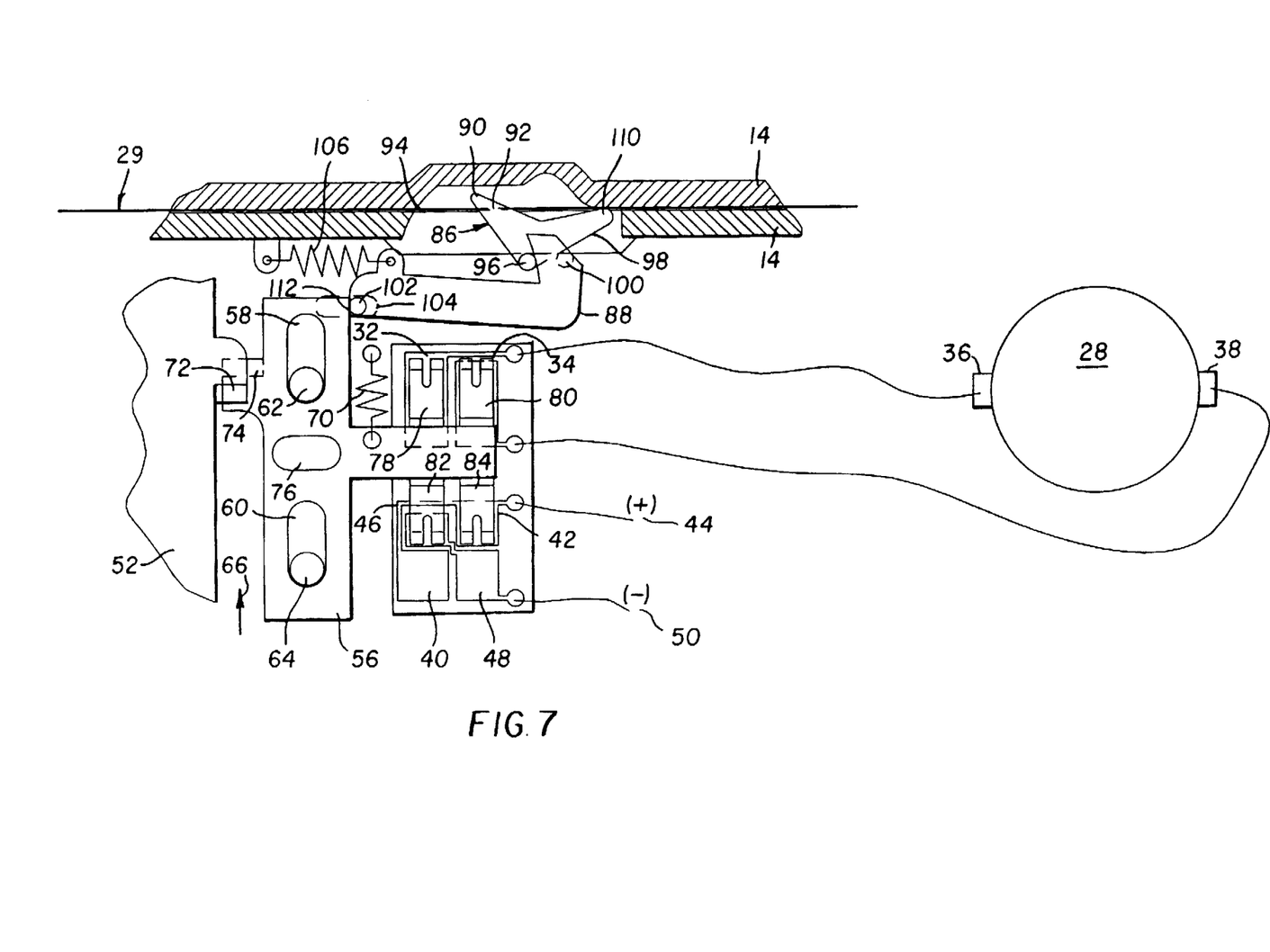
Figure 8:
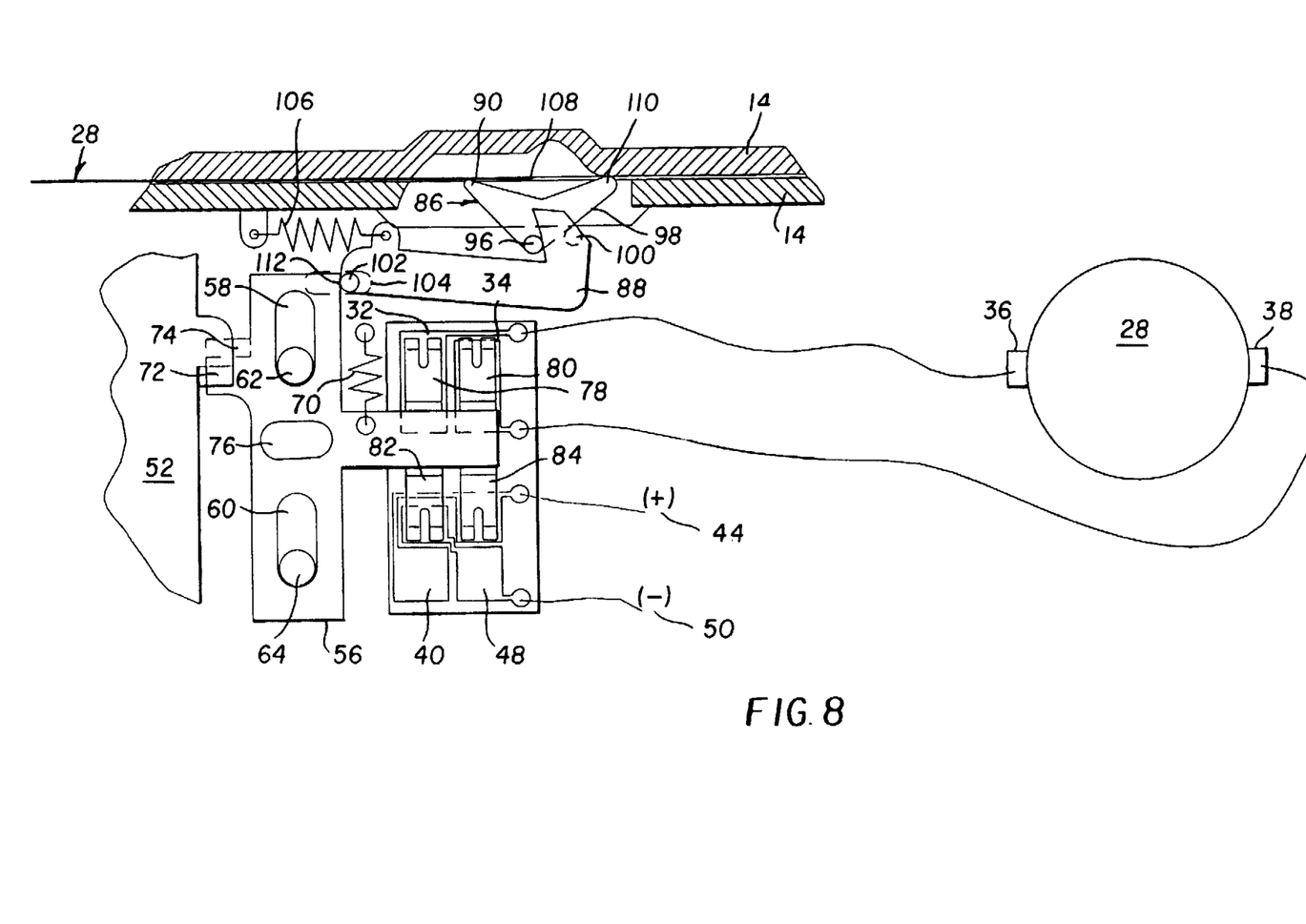
Figure 9:
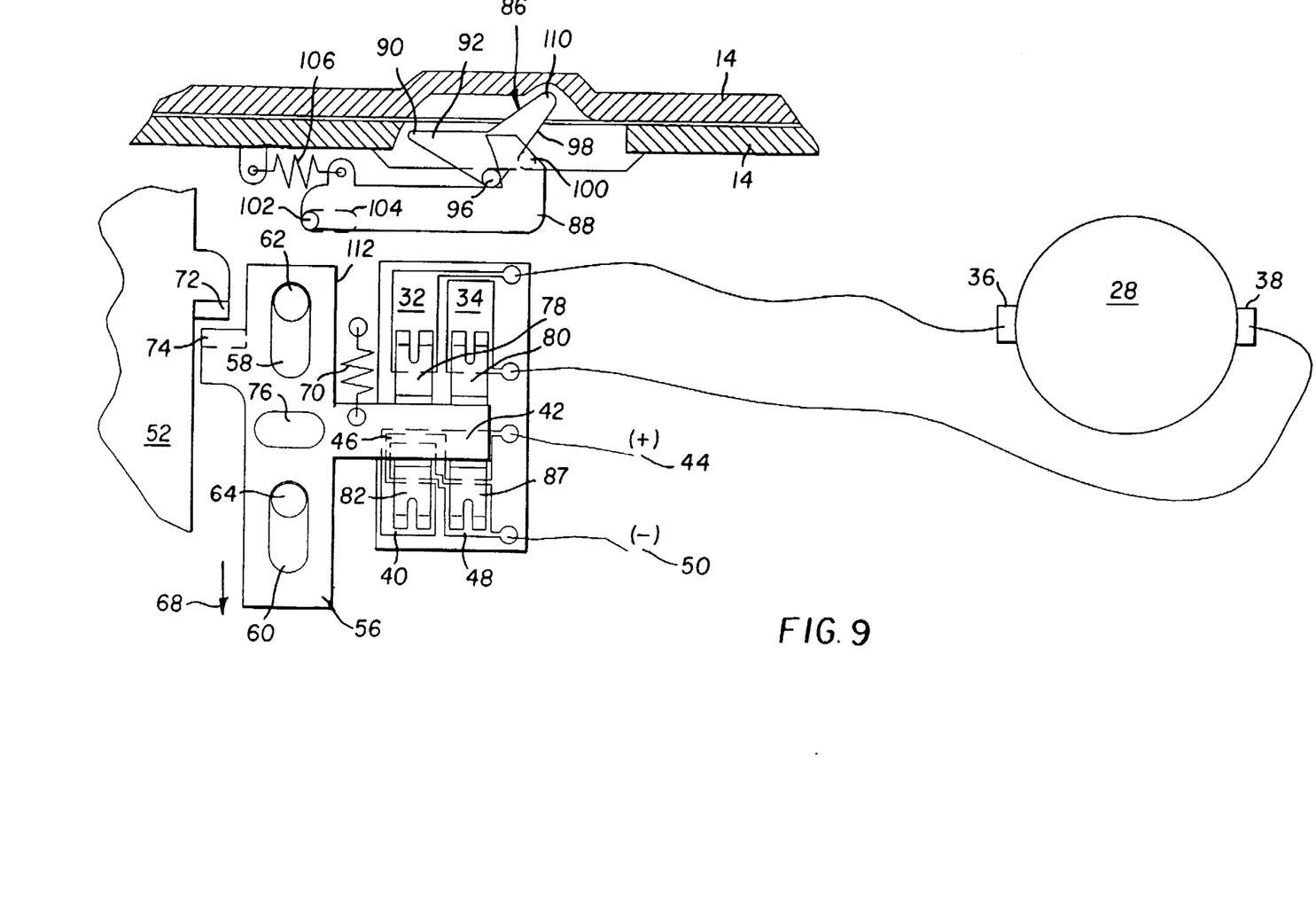

A bottom door 52, shown in FIG. 1, is pivotable about a pivot pin 54 to open and close the cartridge receiving chamber 16 in order to load and unload the film cartridge 18. As shown in FIG. 3, an interior latch slide 56 has a pair of longitudinally aligned slots 58 and 60 in which are positioned respective support pins 62 and 64, fixed to the main body part 14, to guide the latch slide for movement in opposite door latching and door releasing directions 66 and 68. A helical tension spring 70 is connected to the main body part 14 and to the latch slide 56 to continuously urge the latch slide in the door latching direction 66. When the bottom door 52 is closed, respective latch tabs 72 and 74 on the bottom door and on the latch slide 56 normally engage to fasten the bottom door closed. FIGS. 1 and 3-8 show the latch slide 56 in this door latched condition. Alternatively, as shown in FIG. 9, an exterior knob 76 on the latch slide 56 can be manually grasped to move the latch slide in the door releasing direction 68 to place the latch slide in a door unlatched condition in which the latch tabs 72 and 74 are disengaged to permit the bottom door 52 to be opened. When the bottom door 52 is re-closed and the exterior knob 76 is manually released, the spring 70 returns the latch slide 56 in the door latching direction 66 from its door unlatched condition to its door latched condition shown in FIGS. 1 and 3-8.

Respective separate electrical wipers 78 and 80, shown in FIG. 3, are connected to the underside of the latch slide 56 to be continuously in touch with the motor contacts 32 and 34 when the latch slide is moved in the door latching and door releasing directions 66 and 68 between its door latched and door unlatched conditions. Respective separate electrical wipers 82 and 84 are integral with the separate electrical wipers 78 and 80 and are changed from in touch with the one positive contact 40 and the one negative contact 48 to in touch with the other negative contact 46 and the other positive contact 42 when the latch slide 56 is moved, as shown in FIG. 7, slightly farther in the door latching direction 66 (without changing from its door latched condition) via the spring 70. This changes the existing direction mode of the motor 28 from its forward direction mode for intermittent advance of the filmstrip 29 from the supply spool 30 inside the cartridge 18 to the take-up spool 22 to its reverse direction mode for continuous rewind of the filmstrip from the take-up spool back to the supply spool. Then, as shown in FIG. 8, the motor 28 is immediately operated to rewind the filmstrip 29 from the take-up spool 22 back to the supply spool 30. After film rewind is completed, the latch slide 56 is to be manually moved in the door releasing direction 68 to change from its door latched condition to its door unlatched condition in order to permit the bottom door 52 to be opened to remove the film cartridge 18 from the cartridge receiving chamber 16. Movement of the latch slide 56 in the door releasing direction 68 to change from its door latched condition to its door unlatched condition changes the electrical wipers 82 and 84 from in touch with the one negative contact 46 and the one positive contact 42 to in touch with the other positive contact 40 and the other negative contact 48. Compare FIGS. 8 and 9. This changes the existing direction mode of the motor 28 from the reverse direction mode for continuous rewind of the filmstrip 29 from the take-up spool 22 to the supply spool 30 inside the film cartridge 18 to the forward direction mode for intermittent advance of the filmstrip from the supply spool to the take-up spool. Of course, as shown in FIGS. 1 and 3, the motor 28 (although then in the forward direction mode) would not be immediately operated for film advance.

Figure 5:
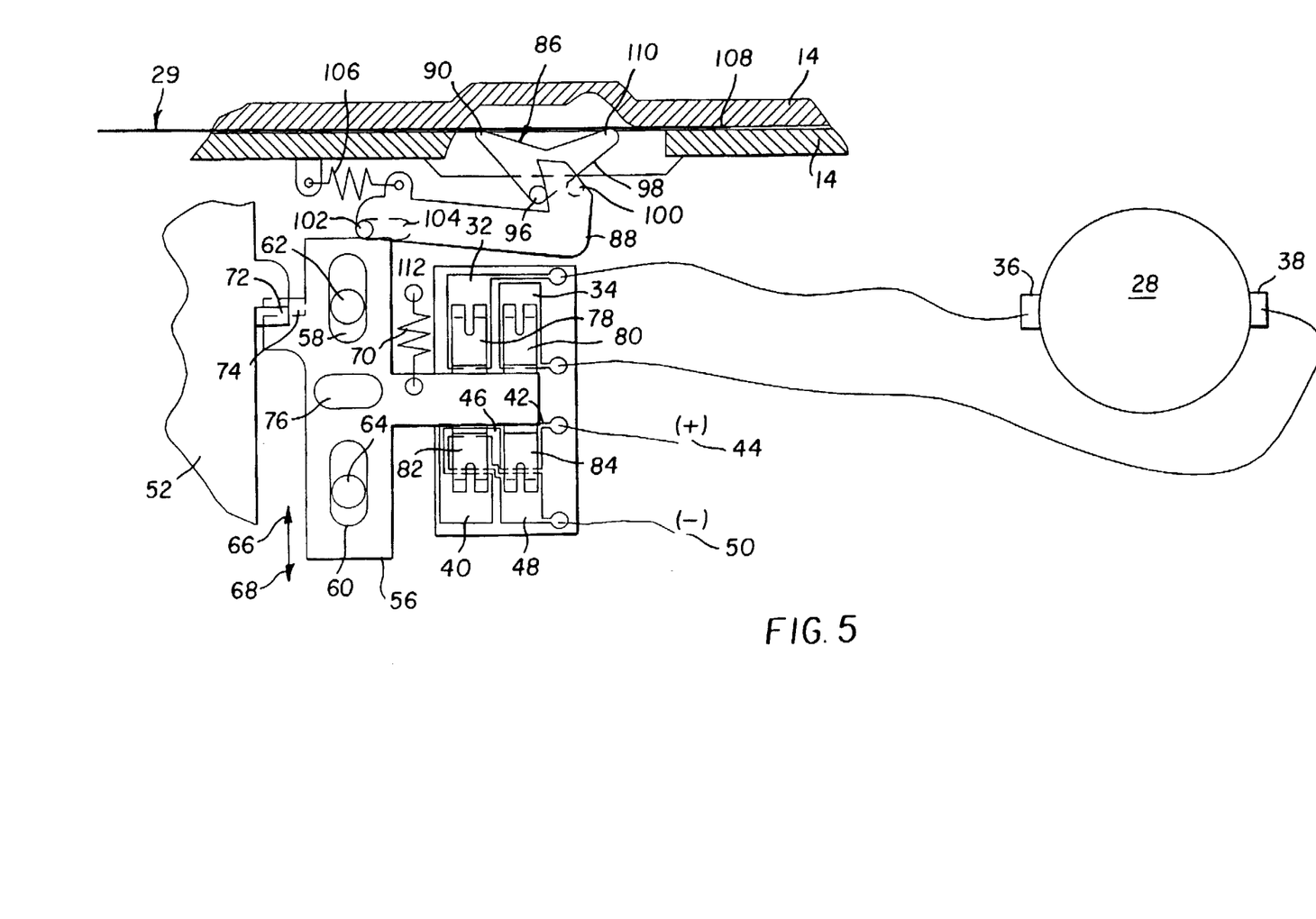
Figure 6:
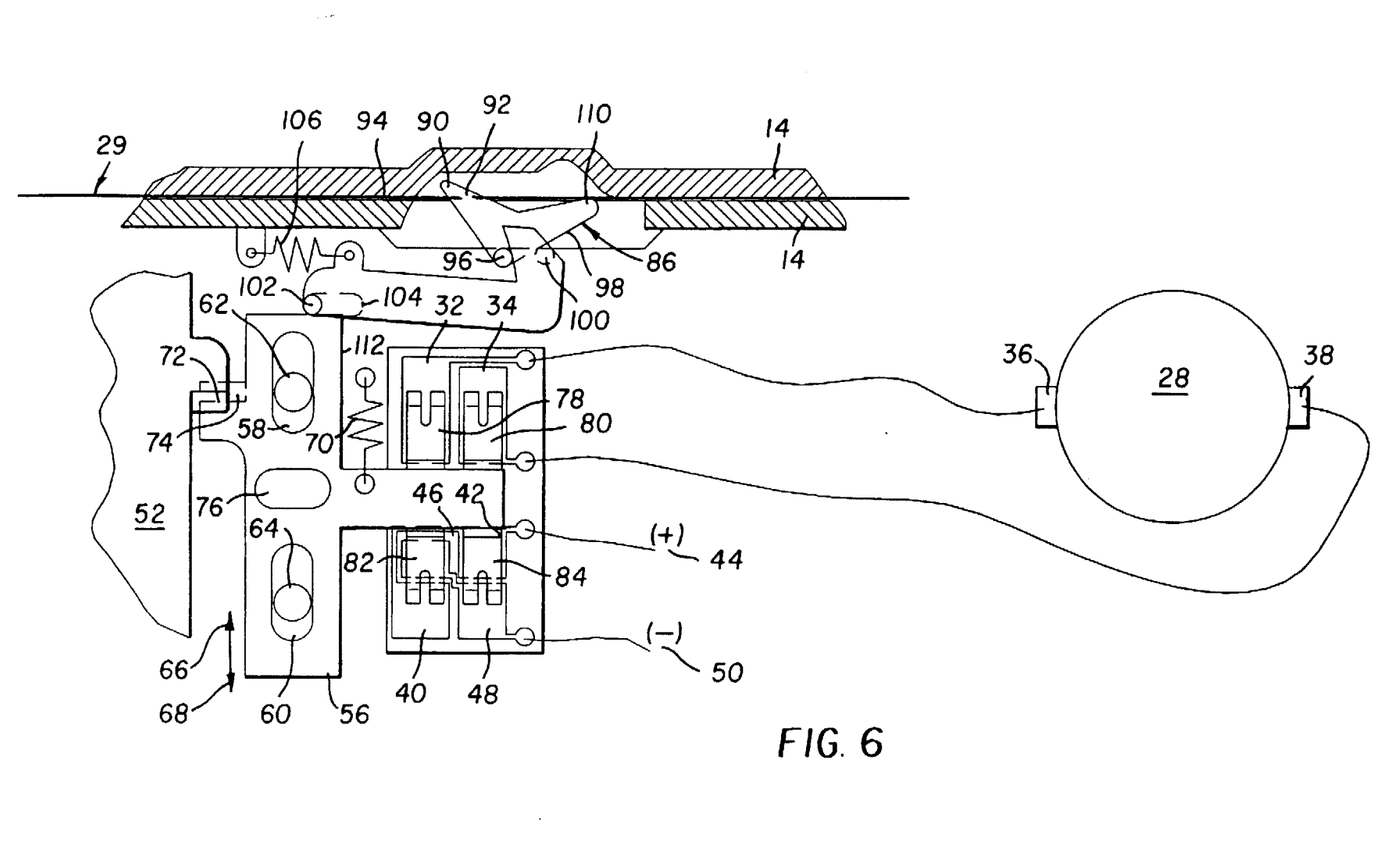

As shown in FIGS. 6–8, a perforation sensor pawl 86 and a latch retainer 88 are independently supported for a pawl arm 90 to engage the filmstrip 29 at a turn-around perforation 92 in a trailing end portion 94 of the filmstrip as the filmstrip is advanced via the motor 28 onto the take-up spool 22 and then to move with the filmstrip to make the latch retainer release the latch slide 56. Release of the latch slide 56 permits the latch slide to be moved slightly farther in the door latching direction 66 (without changing from its door latched condition) via the spring 70 in order to change the direction mode of the motor 28 for rewind of the filmstrip 29 onto the supply spool 30 inside the film cartridge 18. The perforation sensor pawl 86 has a pivot pin 96 that is supported on the main body part 14 to allow the requisite movement of the perforation sensor pawl, and it has a pawl edge 98 that continuously abuts a follower pin 100 on the latch retainer 88. The latch retainer 88 has a retention pin 102 that is supported in a slot 104 in the main body part 14 and that protrudes from the slot to the latch slide 56 in order to hold the latch slide against the urging of the spring 70 in the door latching direction 66. See FIGS. 1 and 3–6. A helical tension spring 106 is connected to the main body part 14 and to the latch retainer 88, but is prevented from moving the latch retainer to the left in FIGS. 1 and 3–6 because of the abutment of the pawl edge 98 with the follower pin 100 on the latch retainer.

Operation

Figure 4:
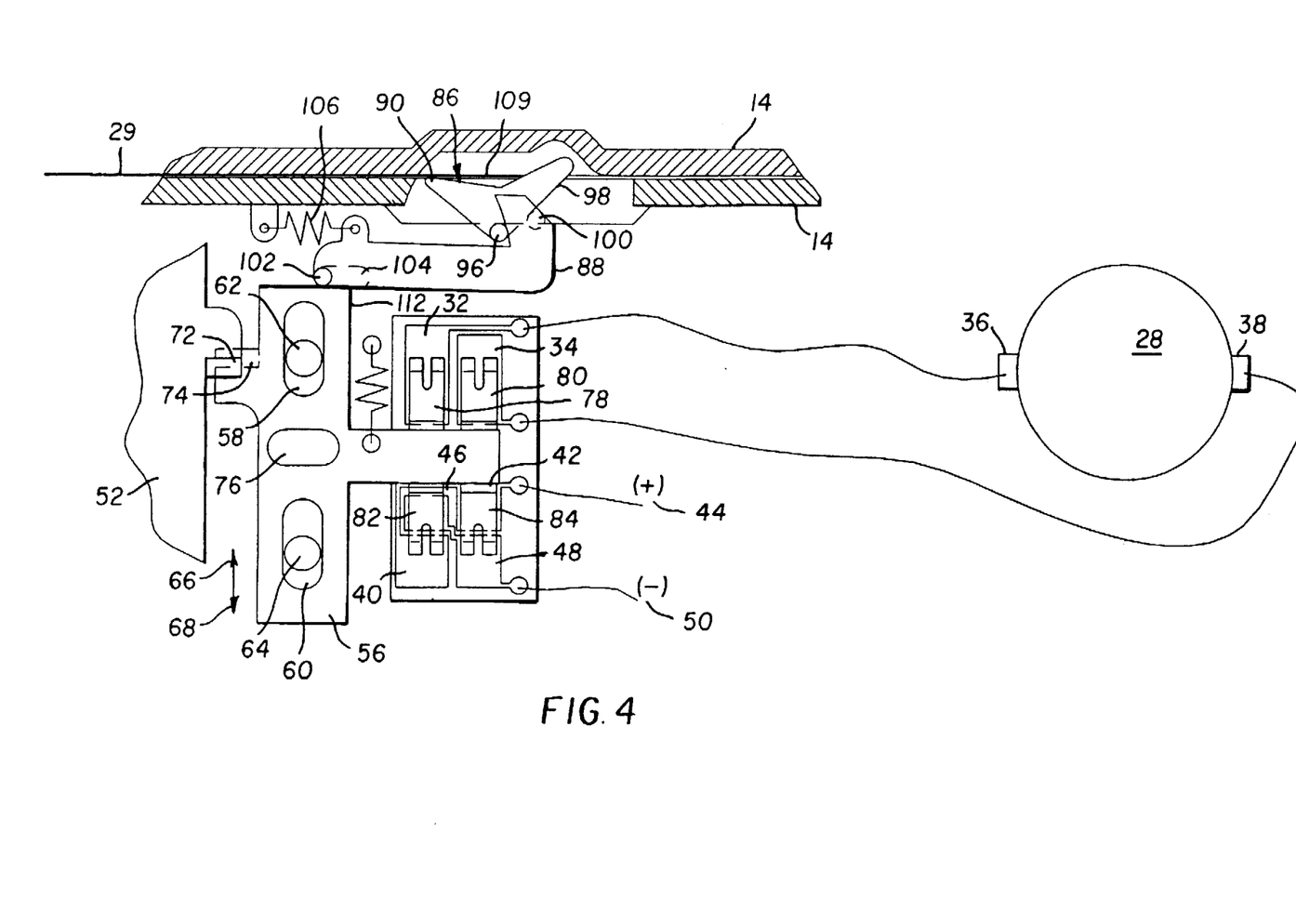

Beginning with FIGS. 4 and 5, the motor 28 is operated in the forward direction mode to advance a leading end portion 108 of the filmstrip 29 first to and then over a pawl arm 110 of the perforation sensor pawl 86. The perforation sensor pawl 86 is pivoted clockwise about its pivot pin 96 and slightly depressed in FIG. 5 via the leading end portion 108 of the filmstrip 29 and the latch retainer 88 is pivoted slightly clockwise about its retention pin 102 in FIG. 5 via the pawl edge 98 abutting the follower pin 100 on the latch retainer 88. Then, the leading end portion 108 of the filmstrip 29 is automatically attached to the take-up spool 22, not shown.

The take-up spool 22 is rotated via the motor 28 after each exposure to advance successive frames of the filmstrip 29 from the cartridge 18, across the backframe opening 24, and onto the take-up spool. Each time the take-up spool 22 is rotated, an unexposed frame of the filmstrip is positioned across the backframe opening 24 and an exposed frame is wound onto the take-up spool. When every one of the available frames have been exposed, the trailing end portion 94 of the filmstrip 29 remains attached to the supply spool 30 inside the cartridge 18.

FIG. 6 shows the pawl arm 90 of the perforation sensor pawl 86 engaging the filmstrip 29 at the turn-around perforation 92 in the trailing end portion 94 of the filmstrip.

FIG. 7 shows the trailing end portion 94 of the filmstrip 29 advanced slightly farther than in FIG. 6 to similarly advance the perforation sensor pawl 86 and make the pivot pin 96 of the perforation sensor pawl pull the latch retainer 88 to the right in FIG. 7, which removes the retention pin 102 from the latch slide 56 to allow the spring 70 to move the latch slide 56 slightly farther in the door latching direction 66 (without changing from its door latched condition). This changes the existing direction mode of the motor 28 from its forward direction mode for intermittent advance of the filmstrip 29 from the supply spool 30 inside the cartridge 18 to the take-up spool 22 to its reverse direction mode for continuous rewind of the filmstrip from the take-up spool back to the supply spool. Then, as shown in FIG. 8, the motor 28 is immediately operated to rewind the filmstrip 29 from the take-up spool 22 back to the supply spool 30.

In FIGS. 7 and 8, a latch edge 112 of the latch slide 56 abuts the retention pin 102 of the latch retainer 88 to hold the latch retainer against the urging of the spring 106. However, when in FIG. 9 the latch slide 56 is manually moved in the door releasing direction 68 to change from its door latched condition to its door unlatched condition, the existing direction mode of the motor 28 is changed from its reverse direction mode for continuous rewind of the filmstrip 29 from the take-up spool back 22 to the supply spool 30 inside the cartridge 18 to its forward direction mode for intermittent advance of the filmstrip from the supply spool to the take-up spool. Of course, as shown in FIGS. 1 and 3, the motor 28 (although then in the forward direction mode) would not be immediately operated for film advance.

Lastly, the bottom door 52 is opened to remove the film cartridge 18 from the cartridge receiving chamber 16.

The invention has been described with reference to a preferred embodiment. However, it will be appreciated that variations and modifications can be effected by a person of ordinary skill in the art without departing from the scope of the invention. For example, when in FIG. 9 the latch slide 56 is manually moved in the door releasing direction 68 to change from its door latched condition to its door unlatched condition, instead of changing the electrical wipers 82 and 84 from in touch with the one negative contact 46 and the one positive contact 42 to in touch with the other positive contact 40 and the other negative contact 48, the wipers can be moved to a neutral position not in touch with any of the positive and negative contacts.

PARTS LIST 10. motorized camera
12. housing
14. main body part
16. cartridge receiving chamber
18. film cartridge
20. exposed film roll chamber
22. film take-up spool
24. backframe opening
26. front taking lens 28. bi-directional film drive motor
29. filmstrip
30. film supply spool
32. motor contact
34. motor contact
36. motor pole
38. motor pole
40. positive contact
42. positive contact
44. positive terminal
46. negative contact
48. negative contact
50. negative terminal
52. bottom door
54. pivot pin
56. latch slide
58. latch slot
60. latch slot
62. support pin
64. support pin
66. door latching direction
68. door releasing direction
70. spring
72. latch tab
74. latch tab
76. knob
78. electrical wiper
80. electrical wiper
82. electrical wiper
84. electrical wiper
86. perforation sensor pawl
88. latch retainer
90. pawl arm
92. turn-around perforation
94. trailing end portion
96. pivot pin
98. pawledge
100. follower pin
102. retention pin
104. slot
106. spring
108. leading end portion
110. pawl arm
112. latch edge

What is claimed is:

1. A motorized camera comprising a bidirectional film drive motor having respective direction modes for film advance and for film rewind, and a movable door latch, is characterized in that:

said door latch is coupled with said motor to change the direction mode of the motor only when the door latch is moved.

2. A motorized camera as recited in claim 1, wherein said door latch is supported for movement in a door releasing direction and is coupled with said motor to change the direction mode of the motor from one for film rewind to one for film advance when moved in said door releasing direction.

3. A motorized camera as recited in claim 1 or 2, wherein said door latch has a door latched condition and is supported for movement in a door latching direction when in said door latched condition and is coupled with said motor to change the direction mode of the motor from one for film advance to one for film rewind when moved in said door latching direction.

4. A motorized camera as recited in claim 3, wherein a sensor is configured to sense an end-of-film condition, and a latch retainer is supported to prevent movement of said door latch in said door latching direction and to release said door latch for movement in the door latching direction after said sensor senses the end-of-film condition.

5. A motorized camera as recited in claim 1, wherein a perforation sensor and a latch retainer are supported for said perforation sensor to engage a filmstrip at a trailing turn-around perforation in the filmstrip when the filmstrip is advanced via said motor and then to move with the filmstrip to make said latch retainer release said door latch to permit the door latch to be moved to change the direction mode of the motor for film rewind.

6. A motorized camera as recited in claim 5, wherein a spring urges said door latch to be moved to change the direction mode of said motor for film rewind.

7. A motorized camera as recited in claim 1, wherein respective motor contacts are connected to opposite poles of said motor, a pair of positive contacts are each connected to a positive terminal of a battery, a pair of negative contacts are each connected to a negative terminal of the battery, and said door latch has respective electrical wipers continuously in touch with said motor contacts when the door latch is moved and respective wipers that are moved from in touch with one of said positive contacts and one of said negative contacts to in touch with the other negative contact and the other positive contact when the door latch is moved, in order to change the direction mode of said motor.

* * * * *